(12) United States Patent
Kim et al.

(10) Patent No.: US 11,861,749 B2
(45) Date of Patent: Jan. 2, 2024

(54) APPARATUS AND METHOD FOR CALCULATING ESTIMATE FOR INSTALLATION OF WATER HEATER

(71) Applicant: KYUNGDONG NAVIEN CO., LTD., Gyeonggi-do (KR)

(72) Inventors: Si Hwan Kim, Seoul (KR); Heung Rak Son, Seoul (KR)

(73) Assignee: Kyungdong Navien Co., Ltd., Gyeonggi-do (KR)

(*) Notice: Subject to any disclaimer, the term of this patent is extended or adjusted under 35 U.S.C. 154(b) by 691 days.

(21) Appl. No.: 16/921,246

(22) Filed: Jul. 6, 2020

(65) Prior Publication Data

US 2021/0012396 A1 Jan. 14, 2021

(30) Foreign Application Priority Data

Jul. 11, 2019 (KR) .................. 10-2019-0083924

(51) Int. Cl.
*G06Q 30/02* (2023.01)
*G06Q 50/16* (2012.01)
*G06Q 30/0283* (2023.01)
*G06Q 10/0875* (2023.01)
*G06N 20/00* (2019.01)
(Continued)

(52) U.S. Cl.
CPC .......... *G06Q 50/163* (2013.01); *F24H 9/2007* (2013.01); *G05B 19/4155* (2013.01); *G06N 20/00* (2019.01); *G06Q 10/0875* (2013.01); *G06Q 30/0283* (2013.01); *G06T 7/0004* (2013.01); *G06T 7/62* (2017.01); *G06T 7/70* (2017.01); *G05B 2219/50333* (2013.01); *G06T 2207/30164* (2013.01); *G06V 20/20* (2022.01)

(58) Field of Classification Search
CPC .. G06Q 30/0283; G06Q 50/163; G06N 20/00; G06K 9/00671; G06T 7/62; G06T 7/70; G06T 7/004; G05B 19/4155
USPC .......................................................... 705/29
See application file for complete search history.

(56) References Cited

U.S. PATENT DOCUMENTS 6,216,108 B1 * 4/2001 LeVander .......... G06Q 30/0203
705/400
8,805,000 B2 * 8/2014 Derby .................... G06Q 50/06
382/209
(Continued)

FOREIGN PATENT DOCUMENTS

JP 4441776 B2 3/2010
JP 2012180191 A 9/2012
(Continued)

*Primary Examiner* — Andrew Joseph Rudy

(57) ABSTRACT

An apparatus for calculating an estimate for installation of a water heater according to an embodiment of the present invention may include an image analysis unit for analyzing a water heater region image including at least one of a previously-installed water heater main body, a previously-installed pipe connected to the previously-installed water heater main body for fluid flow, and a room controller for controlling a water heater, and a processing unit for calculating estimate required for the installation of a water heater to be installed on the basis of at least one of information about the model of the water heater to be installed and required dimensions of a pipe to be installed obtained on the basis of an analysis result of the image analysis unit.

18 Claims, 14 Drawing Sheets

(51) Int. Cl.
*G05B 19/4155* (2006.01)
*G06T 7/62* (2017.01)
*G06T 7/70* (2017.01)
*G06T 7/00* (2017.01)
*F24H 9/20* (2022.01)
*G06V 20/20* (2022.01)

(56) References Cited

U.S. PATENT DOCUMENTS

| | | | |
|---|---|---|---|
| 11,566,891 B2* | 1/2023 | Pershing | G06Q 50/16 |
| 11,610,269 B2* | 3/2023 | Plummer | G06Q 40/08 |
| 2023/0077373 A1* | 3/2023 | Poivet | F24S 25/13 |

FOREIGN PATENT DOCUMENTS

| | | |
|---|---|---|
| KR | 101465585 B1 | 11/2014 |
| KR | 20190065933 A | 6/2019 |

* cited by examiner

APPARATUS AND METHOD FOR CALCULATING ESTIMATE FOR INSTALLATION OF WATER HEATER

CROSS-REFERENCE TO RELATED APPLICATION

The present application claims the benefit of priority to Korean Patent Application No. 10-2019-0083924, filed on Jul. 11, 2019 with the Korean Intellectual Property Office, the entire disclosure of which is incorporated herein by reference.

TECHNICAL FIELD

The present invention relates to an apparatus and a method for automatically calculating an estimate for the installation of a water heater.

BACKGROUND ART

When replacing a water heater, for example a boiler, which has been previously installed, a user of the boiler usually contacts an after-sales service center and an installation agency to replace the boiler through a boiler installation agent. In order to replace a previously-installed boiler in a manner described above, objects around the previously-installed boiler are moved to a different place and heating water inside the boiler is drained. Then, pipes connected to the boiler need to be separated.

Next, a flue at the top of the boiler is separated, and in order to send exhaust gas to the outside, the flue is separated from a hole drilled on a wall or a hole drilled on a window through which the flue is installed. Then, the boiler installed on the wall is removed, and according to the position of the flue to be connected to an upper portion of a new boiler to be installed and the position of the wall hole or the window hall through which exhaust gas is sent to the outside, a position to fix the new boiler is determined. In addition, a lower pipe is cut such that a lower connection pipe previously installed and a pipe of the new boiler to be installed are connected.

Then, the new boiler is fixed using an anchor bolt installed on the wall, the flue is inserted back into the wall hole or the window hole through which exhaust gas is to be sent to the outside, and the middle portion of the boiler flue is adjusted to install the flue on an upper portion of the new boiler to be installed. Also, in order to connect the lower pipe cut and a new pipe, the new pipe is cut and adjusted to be connected to the new boiler according to the position of the new boiler.

As such, a procedure for replacing a boiler is very complicated for the general public to understand and varies depending on an installation environment, so that when a user of the boiler requests a service center or a dealer to replace the boiler without knowing any information in advance, an estimate higher than expected may be estimated.

Therefore, it is difficult for the user without knowledge of a boiler to determine whether the replacement estimate of the boiler has been properly calculated.

DISCLOSURE OF THE INVENTION

Technical Problem

The present invention provides an apparatus and a method for calculating an estimate for installation of a boiler, in which when a water heater is newly installed, an installation estimate is automatically calculated through an image analysis for the water heater, thereby enabling a user of the water heater to anticipate an installation estimate in advance, and correct information about a required estimate is provided even after the installation of the water heater, thereby securing reliability in the installation estimate.

Technical Solution

An apparatus for calculating an estimate for installation of a water heater according to an embodiment of the present invention may include an image analysis unit for analyzing a water heater region image including at least one of a previously-installed water heater main body, a previously-installed pipe connected to the previously-installed water heater main body for fluid flow, and a room controller for controlling a water heater, and a processing unit for calculating an estimate required for the installation of a water heater to be installed on the basis of at least one of information about the model of the water heater to be installed and required dimensions of a pipe to be installed obtained on the basis of an analysis result of the image analysis unit.

A method for calculating an estimate for installation of a water heater according to an embodiment of the present invention may include analyzing a water heater region image including at least one of a previously-installed water heater main body, a previously-installed pipe connected to the previously-installed water heater main body for fluid flow, and a room controller for controlling a water heater, and calculating an estimate required for the installation of a water heater to be installed on the basis of at least one of information about the model of the water heater to be installed and required dimensions of a pipe to be installed obtained the basis of an analysis result of the water heater region image.

Advantageous Effects

According to an apparatus and a method for calculating an estimate for installation of a water heater, when a water heater is newly installed, an installation estimate is automatically calculated through an image analysis for the water heater, thereby enabling a user of the water heater to anticipate installation an estimate in advance, and correct information about an estimate required is provided even after the installation of the water heater, thereby securing reliability in the installation estimate.

MODE OF IMPLEMENTATION OF THE INVENTION

Figure 1:
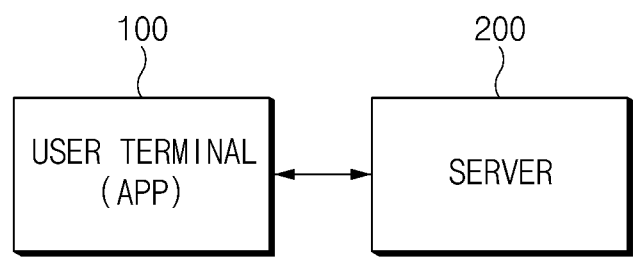
FIG. 1 is a diagram showing a user terminal and a server for calculating an estimate for installation of a boiler according to an embodiment of the present invention.

Hereinafter, various embodiments of the present invention will be described in detail with reference to the accompanying drawings. In the present document, like reference numerals are used for like elements throughout the drawings, and redundant descriptors of the like elements are omitted.

For the various embodiments of the present invention disclosed in the present document, specific structural to functional descriptions are merely illustrative of the present invention. The various embodiments of the present invention may be embodied in various forms and should not be construed as limited to the embodiments set forth herein.

Terms such as "a first," "a second," "first," and "second" used in various embodiments may modify various components regardless of the order and/or importance thereof, and do not limited the corresponding components. For example, a first component may be referred to as a second component without departing from the scope of the present invention, and similarly, a second component may also be referred to as a first component.

The terms used in this document are only used to describe specific embodiments, and may not be intended to limit the scope of other embodiments. Singular expressions may include plural expressions unless the context clearly indicates otherwise.

All the terms used herein, including technical or scientific terms, may have the same meanings as those commonly understood by those skilled in the art of the present invention. Terms that are defined in a dictionary commonly used should be interpreted as having the same or similar meaning to the meaning in the context of the related art, and should not be interpreted as having an ideal or overly formal meaning unless explicitly defined in the present document.

In some cases, even the terms defined in this document should not be interpreted as excluding embodiments of the present invention.

Hereinafter, in describing an apparatus for calculating an estimate for installation of a water heater according to the present invention, the water heater is described to be a boiler as an example. However, the apparatus for calculating an estimate for installation of a water heater of the present invention is not limited to a boiler, but may be applied to various apparatuses for heating water, such as a water heater and a water heater combined boiler.

FIG. 1 is a diagram showing a user terminal and a server for calculating an estimate for installation of a boiler according to an embodiment of the present invention;

A user terminal 100 may have an application for calculating an estimate for installation of a boiler. Therefore, using the application installed in the user terminal 100, a user him/herself may capture an image of a region in which a boiler is installed and transmit through a network the captured image to a server 200 for calculating an estimate for installation of a boiler.

In addition, when the user selects, on the application, a model of a boiler to be installed, information on the selected model of a boiler may be transmitted to the server 200 through a network.

Accordingly, the server 200 analyzes the image received from the user terminal 100 to calculate required dimensions of each material (e.g., a boiler main body, pipes, and the like) of a region in which the boiler is to be installed, and may calculate a total boiler installation estimate in consideration of the price of the boiler model selected by the user and the installation estimate according to the required dimensions of each material.

In addition, the sever 200 transmit the calculated for calculating an estimate for installation to the application of the user terminal 100 to allow the user to identify an expected estimate in advance before installing a new boiler.

Figure 2:
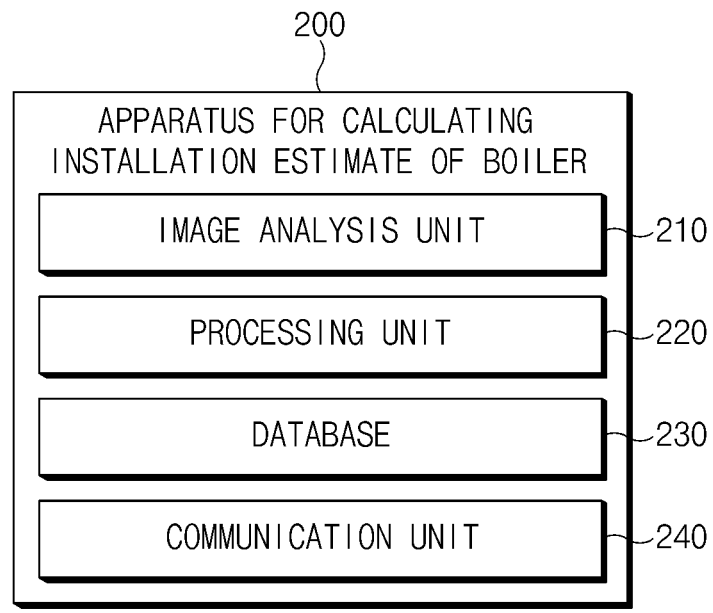
FIG. 2 is a block diagram showing a configuration of an apparatus for calculating an estimate for installation of a boiler according to an embodiment of the present invention.

FIG. 2 is a block diagram showing a configuration of an apparatus for calculating an estimate for installation of a boiler according to an embodiment of the present invention;

Referring to FIG. 2, the apparatus 200 for calculating an estimate for installation of a boiler according to an embodiment of the present invention may include an image analysis unit 210, a processing unit 220, a database 230, and a communication unit 240.

The image analysis unit 210 may analyze a boiler region image including at least one of a previously-installed boiler main body, a pipe connected to the previously-installed boiler main body for fluid flow, and a room controller for controlling a boiler. At this time, the boiler may include all types of boilers, such as a floor-type boiler and a wall-mounted boiler which are classified according to the installation position thereof, a general boiler, a condensing boiler, and a boiler using electricity, gas, or oil. In addition, the pipe may include all types of pipes connected to a boiler main body, such as a flue which sucks air for boiler combustion and discharges exhaust gas, a heating water pipe, and a hot water and cold water pipes.

The image analysis unit 210 may obtain at least one of a first information, a second information, or a third information by analyzing the boiler region image including the previously-installed boiler main body and the pipe. For example, the boiler region image may be a front image of a boiler.

At this time, the first information may include information about the model of the previously-installed boiler main body (for example, a model name, a product number, and the like), the second information may include at least one of the dimensions of the boiler main body and the diameter of the pipe in the boiler region image, and the third information may include the dimensions of the pipe in the boiler region image.

The image analyzing unit 210 may obtain the first information on the basis of at least one of an appearance (for example, the design of the boiler main body, a model name written on the boiler main body, and the like) of the boiler main body in the boiler region image, a product specification table of the boiler main body in the boiler region image, and the room controller.

That is, when received a front image of a region in which a boiler is installed, the image analysis unit 210 may obtain information about the model of the boiler through the appearance of the boiler. However, when it is not possible to capture the front image of the boiler due to the limitation of space, the information about the model of the boiler may be obtained through either a product specification table attached on the side of the boiler main body or an image of the room controller installed inside a room.

In addition, the image analysis unit 210 may obtain the first information, the second information, and the third information by analyzing the boiler region image in pixel unit. That is, the image analysis unit 210 may calculate the dimensions of each of the boiler main body and the pipe by analyzing the same in a boiler image received from the user terminal 100 in pixel unit.

The processing unit 220 may calculate an estimate required for the installation of a boiler to be installed on the basis of at least one of information about the model of a boiler to be installed and required dimensions of a pipe to be installed obtained on the basis of the analysis result of the image analysis unit 210.

In addition, the processing unit 220 may calculate the total estimate required for the installation of the boiler to be installed on the basis of the information about the model of the boiler to be installed and the required dimensions of the pipe to be installed obtained using at least one of the first information, the second information, and the third information.

Specifically, the processing unit 220 may calculate the estimate required for the installation of the boiler to be installed by adding a price of a boiler main body to be installed and a price and an installation estimate according to the required dimensions of the pipe. In this case, the processing unit 220 may calculate an installation estimate not only for a case in which both a boiler main body and a pipe are replaced together but also for a case in which either a boiler main body or a pipe is replaced.

In addition, the processing unit 220 may determine a position at which the main body of the boiler to be installed is to be installed and adjust the required dimensions of the pipe to be installed calculated above according to the determined position. At this time, on the basis of the adjusted dimensions of the pipe, the estimate required for the installation of the boiler to be installed may be calculated.

For example, the dimensions and installation position between a boiler previously installed and a boiler to be installed may be different. In this case, required dimensions of a pipe obtained based on the size of the previously-installed boiler main body may not be suitable for the boiler main body to be installed.

In this case, the processing unit 220 may adjust the required dimensions of a pipe obtained based on the previous boiler in consideration of both the size and the installation position of the boiler main body to be newly installed.

Specifically, a region of the boiler main body to be newly installed is overlapped on a region of the previously-installed boiler main body, and then, by setting a portion in which the boiler main body to be newly installed and a pipe to be installed are connected as a starting point and setting a point at which a previously-installed pipe ends as an end point, an actual distance between the two points may be calculated. In this case, in consideration of a hole on a window or wall through which the pipe to be installed is connected to the outside and a position of a distributor connected to the pipe, the required dimensions of the pipe to be installed may be further corrected. In this case also, an analysis in pixel unit for each material on the boiler region image may be performed.

In the case of calculating an installation estimate by obtaining required dimensions of a pipe to be installed, the processing unit 220 may calculate the installation estimate of the pipe by first calculating the total length of the pipe to be installed, and according to the length of the pipe to be installed, determining whether to use a mid-pipe connection part and a pipe sagging prevention fixing pin.

In addition, with respect to the inside and outside of a wall hole or the inside and outside of a window hall through which a new pipe has been installed to discharge exhaust gas, the processing unit 220 may also calculate a manpower estimate for finishing the connection of the pipe installed on the wall and when a pipe is installed on the window, an estimate according whether or not the window is to be replaced.

The processing unit 220 may obtain, in consideration of the position and length of heating supply water, returning water, cold water, hot water, a gas supply lines and the installation position and dimensions of the pipe, the position and dimensions of a lower connecting pipe according to the position of the boiler to be newly installed. In addition, the processing unit 200 is allowed to change the material of the pipe according to the selection of a boiler user, and may take a manpower estimate based on the change in the installation estimate of the boiler.

The processing unit 220 obtains required dimensions of the boiler from the database 230 using the first information, and may obtain required dimensions of the pipe on the basis of a ratio between the required dimensions of the boiler and the dimensions of the boiler main body in the boiler region image. This will be described later in detail with reference to FIG. 8B.

In addition, the processing unit 220 obtains an actual diameter of the pipe from the database 230 using the first information, and may obtain the required dimensions of the pipe on the basis of a ratio between the actual diameter of the pipe and the diameter of the pipe in the boiler region image.

Basically, pipes are often standardized according to the model of a boiler. That is, since standards (e.g., diameter) of a pipe (e.g., a flue, heating supply and returning water piping pipes) used for a specific model of a boiler are already determined, when the model name of a boiler is known, the dimensions (diameter) of a pipe used in the corresponding model may be obtained. Therefore, on the basis of the information about the model of a boiler obtained in the image analysis unit 210, the processing unit 220 obtains information about the diameter of a pipe used in the corresponding model, and may calculate required dimensions of other materials using the information.

The processing unit 220 obtains information about the price of a distributor and information about the installation estimate thereof from the database 230, and on the basis of the information about the price and the installation estimate of the distributor, may calculate an estimate required for the installation of the distributor.

When the installation of a boiler is completed, the processing unit 220 may make a list of time required for work and materials used to install the boiler for each boiler region image to calculate the estimate required for the actual installation of the boiler and may store the data in the database 230.

In this case, the processing unit 220 may perform data learning through Machine Learning on the basis of data obtained by matching the time required for work and the materials used to install the boiler listed for each image stored in the database 230 with the estimate required for the actual installation of the boiler.

Meanwhile, when it is not possible for a user to capture a front image of a boiler, the processing unit 220 may obtain a second information and a third information on the basis of a boiler region image including a side surface of a boiler main body and a pipe. This will be described later in detail with reference to FIG. 5A and FIG. 5B.

For example, there may be objects present near a boiler in a boiler region image. In this case, the objects near the boiler are moved to a different location, and then moved back to the original location after the installation is finished. As described above, when is an obstacle near the boiler, the processing unit 220 may obtain required dimensions of the corresponding object using at least one of the first information, the second information, and the third information. At this time, on the basis of the installation difficulty (e.g., additional time required due to the interruption to the installation caused by the object or time required to move the object and move back the object) of the boiler to be installed calculated in consideration of the required dimensions of the object, an additional estimate required to install the boiler to be installed is calculated.

In addition, when it is impossible to calculate the required dimensions since the orientation or level of the boiler region image is not aligned, the processing unit 220 may appropriately align the orientation and level of the boiler region image by performing correction of the boiler region image. For example, the processing unit 220 may perform the correction of the boiler region image using data of the boiler image learned through machine learning.

The database 230 may store information about models of boilers, information about required dimensions of boilers and pipes, information about prices of main bodies of boilers and pipes, and information about installation estimates of main bodies of boilers and pipes. In addition, the database 230 may store information about the price and installation estimate of a distributor of the boiler.

For example, the database 230 may include information about models of boilers, model names, product numbers, designs, dimensions (specifications) of pipes, and room controllers. In addition, the price information of the main body of the boiler and the pipe may include price information for each manufacturer and model of the boiler and price information per length for each model of the pipe, and the information about the installation estimate of the main body of the boiler and the pipe may include estimate of removing the main body and pipe of a previously-installed boiler.

In addition, the database 230 may store data obtained by the processing unit 220 by matching the time required for work and the materials used to install the boiler listed for each image with the estimate required for the actual installation of the boiler.

Meanwhile, in FIG. 2, the database 230 is shown to be included in the apparatus for calculating an estimate for installation of a boiler according to the present invention, but is not limited thereto. The database 230 may be separately provided in an external a server, and may be configured such that data is received from the external server to the apparatus for calculating an estimate for installation of a boiler 200 according to the present invention.

The communication unit 240 may receive a boiler region image from the user terminal 100 and receive information about the model of a boiler to be installed selected by a user. In addition, when the estimate required for the installation of the boiler to be installed is calculated by the processing unit 220, the communication unit 240 may transmit a final estimate to the user terminal 100. However, the embodiment of the present invention is not limited thereto. The communication may transmit/receive all the data required between the user terminal 100 and the apparatus for calculating an estimate for installation of a boiler 200.

In addition, when the installation of the boiler is completed, data obtained by contrasting images of main parts before and after the installation of the installed boiler, and data of required estimate, work time, and the like may be transmitted to the user terminal.

Accordingly, the apparatus for calculating an estimate for installation of a water heater according to the present embodiment is applied to a water heater such as a boiler for providing heating, a water heater for providing hot water (a direct-water-type water heater without a separate hot water tank, or a tank-type water heater with a separate hot water tank), or a water heater combined boiler, and may automatically calculate an installation estimate through an image analysis for the water heater.

As described above, according to the apparatus for calculating an estimate for installation of a water heater, when a water heater is newly installed, an installation estimate is automatically calculated through an image analysis for the water heater, thereby enabling a user of the water heater to anticipate installation estimate in advance, and correct information about estimate required is provided even after the installation of the water heater, thereby securing reliability in the installation estimate.

Figure 3:
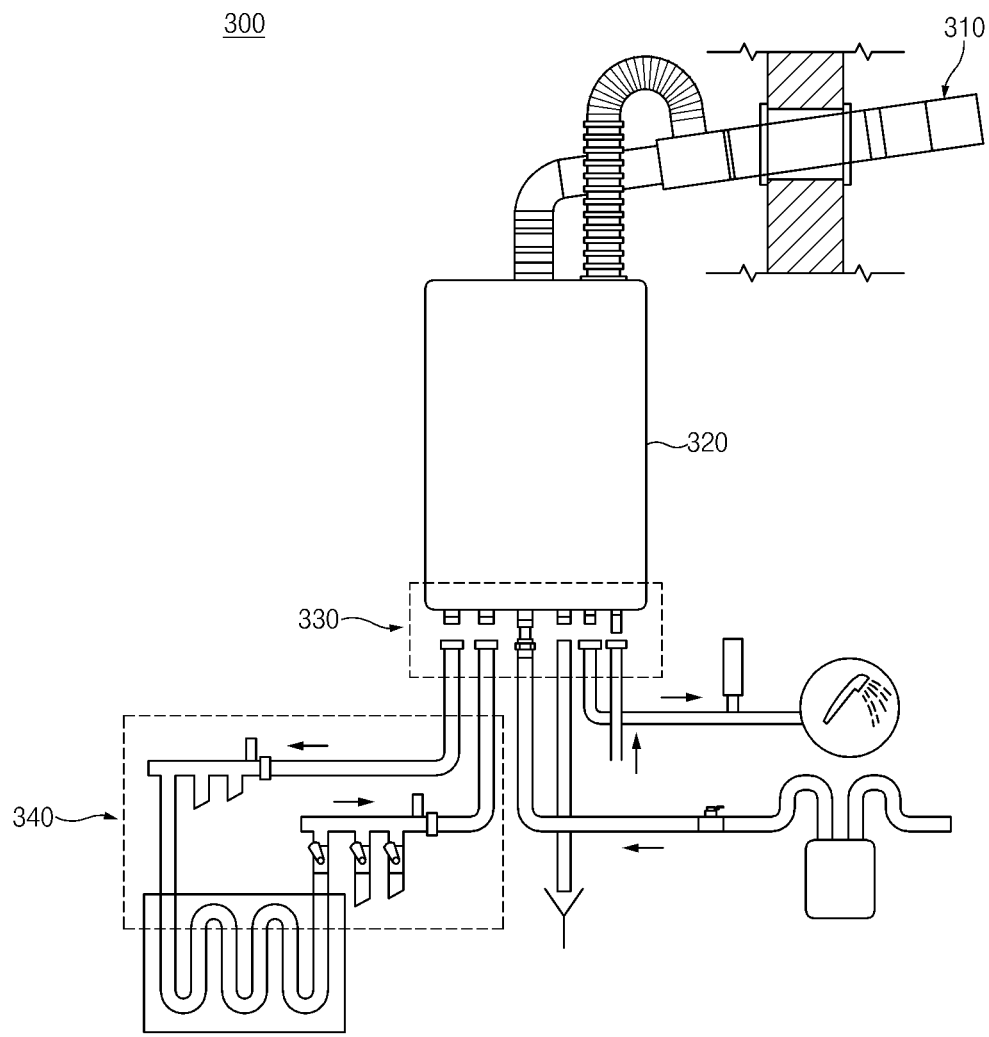
FIG. 3 is a diagram showing elements for calculating an estimate for installation of a boiler having a structure of a typical boiler.

FIG. 3 is a diagram showing elements for calculating an estimate for installation of a boiler having a structure of a typical boiler.

Referring to FIG. 3, a typical boiler 300 may include an upper pipe (flue) 310, a boiler main body 320, a lower pipe 330, and a distributor 340.

The upper pipe 310, that is a flue, is a passage connected to an upper portion of the boiler main body 320 for sucking air for boiler combustion and discharging gas exhausted from the boiler main body 320 to the outside.

The boiler body 320 is where water is heated and evaporated using heat generated by the combustion of fuel.

The lower pipe 330 is connected to a lower portion of the boiler main body 320, and may be, for example, a heating pipe for circulating heating water, and a cold water pipe and a hot water pipe for supplying cold and hot water, respectively.

The distributor 340 evenly distributes heating water heated by the boiler main body 320 using fuel to each room.

Typically, the estimate for replacing the boiler 300 may include an estimate for each of the upper pipe 310, the boiler main body 320, the lower pipe 330, and the distributor 340. Specifically, in the case of the upper pipe 310 and the lower pipe 300, dimensions of the outer diameter of the pipes are generally standardized and the estimate therefor may vary depending on the length of the pipes. In addition, in the case of the boiler main body 320, the price thereof varies depending on the product model, operation method, and the like thereof.

Meanwhile, compared to other components, the distributor 340 rarely needs to be replaced, but may need to be replaced if problems such as rust or water leaking occur to the distributor 340.

A replacement process for a typical boiler is as follows. Hereinafter, the description is made with respect to a condensing boiler. However, as described above, the present invention may be applied to various boilers such as gas and oil boilers.

Objects around the boiler 300 previously installed are moved to a different place. Then, a gas intermediate valve is closed and the power cord of the boiler main body 320 is separated to drain heating water contained inside of the boiler main body 320. Next, the connected heating lower pipe 330 is separated followed by closing an intermediate valve of a cold water line at the bottom of the boiler body 320, and then the cold water and hot water lower pipe 330 is separated from the boiler main body 320.

The upper pipe 310 in the upper portion of the boiler 300 is separated from the boiler main body 320, and in order to send exhaust gas to the outside, the upper pipe 310 is separated from a hole drilled on a wall or a hole drilled on a window through which the upper pipe 310 is installed. At this time, it is preferable to remove the upper pipe 310 while maintaining a finished state around a discharge hole of the upper pipe 310 previously installed.

The boiler main body 320 installed on the wall is removed, and according to the position of the upper pipe 310 to be connected to an upper portion of the boiler 300 to be newly installed and the position of the wall hole or the window hall through which exhaust gas is sent to the outside, a position to fix the boiler 300 is determined. At this time, the position of the boiler main body 320 and the position of the upper pipe 310 need to be adjusted such that the upper pipe 310 is installed upwards by about 5 degrees in the case of a condensing boiler and the upper pipe 310 is installed downwards in the case of a typical boiler.

When the position at which the boiler main body 320 to be installed is identified, the position of an anchor bolt which may be fixed to the wall is marked and inserted according to the corresponding wall position and fixed to prevent shaking.

The lower pipe 330 is cut such that the lower connection pipe 330 previously installed and the boiler main body 320 and the lower pipe 330 are connected.

The boiler body 320 is lifted to be fixed to the anchor bolt installed on the wall, the upper pipe 310 is inserted into the wall hole or the window hole through which exhaust gas is to be sent to the outside, and the middle portion of the upper pipe 310 of the boiler 300 is adjusted to install the upper pipe 310 in a supply/exhaust connection portion of an upper portion of the boiler main body 320 to be newly installed.

A finishing process is performed such that there is no leakage in the connection portion of the boiler main body 320 and the upper pipe 310, and if there is a middle connection portion of the upper pipe 310, a finishing process is performed such that there is no leakage. In addition, a finishing process is also performed for the inside and outside of a wall hole area such that the wall hole area maintains sealing from the outside.

Work is performed to connect the new lower pipe 330 to the heating pipe or the cold water and hot water lower pipes 330 the lower portions of which are cut, and the new pipe (heating pipe, cold water and hot water pipes) 330 is cut and adjusted according to the position of the boiler body main body 320 to be connected to the boiler main body 320.

The connected lower pipe 330 is covered with an insulation material to prevent freezing and busting in winter and heat loss.

In the case of a condensing boiler, condensate water is generated, so the condensate water is fixed toward a near discharge pipe through a discharge hose.

The cold water middle valve and the gas middle valve are open again and power is back on. Thereafter, when water is automatically replenished inside the boiler 300, check whether the boiler operates normally, and check whether there is leakage to the inside of the boiler main body 100 and a connection area of an external gas pipe. In addition, check whether there is leakage to a water pipe area.

Figure 4:
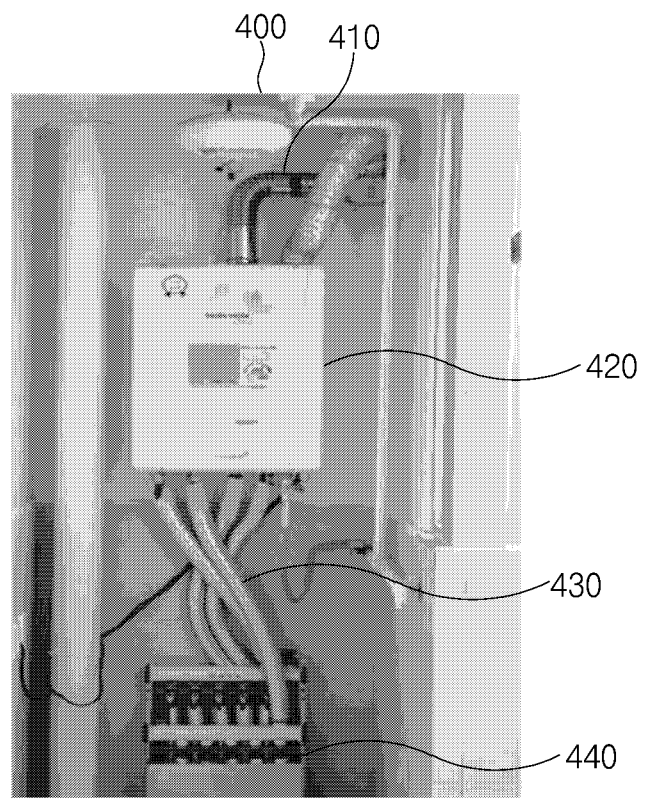
FIG. 4 shows a front image of a boiler received from a user for image analysis by an apparatus for calculating an estimate for installation of a boiler according to an embodiment of the present invention.

FIG. 4 shows a front image of a boiler received from a user for image analysis by an apparatus for calculating an estimate for installation of a boiler according to an embodiment of the present invention.

Figure 5A:
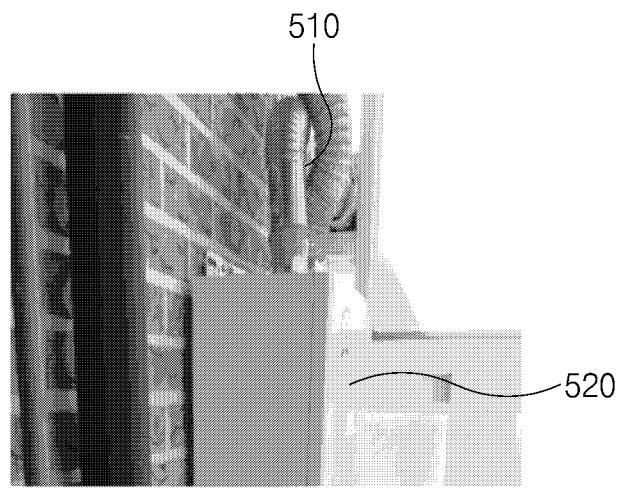
FIG. 5A and FIG. 5B show side images of a boiler received for image analysis by an apparatus for calculating an estimate for installation of a boiler according to an embodiment of the present invention.
Figure 5B:
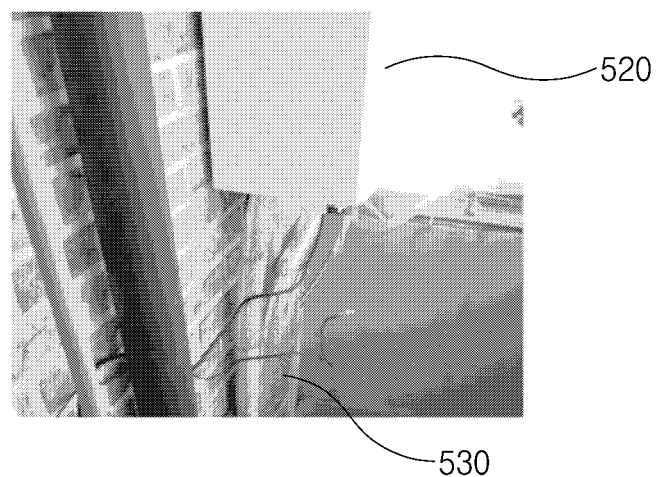

FIG. 5A and FIG. 5B show side images of a boiler received for image analysis by an apparatus for calculating an estimate for installation of a boiler according to an embodiment of the present invention;

Referring to FIG. 4, it is preferable that a region image of a boiler 400 basically includes not only a boiler main body 420 but also an upper pipe (flue) 410 of a boiler, a pipe 430, and a distributor 440.

Therefore, when a front image of a boiler is received by an apparatus for calculating an installation estimate of a boiler according to an embodiment of the present invention, information about the model of the boiler main body 420 and the distributor 440 is obtained through the image and required dimensions of the upper pipe 410 and the pipe 430 are obtained to calculate a total replacement estimate of the boiler.

However, there may be a case in which the space in which a boiler is installed is limited or it is difficult to capture a front image of the boiler doe to the other objects around the boiler. In this case, only a side surface of the boiler or a portion of the boiler may be captured.

As described above, when it is difficult to capture the front image of the boiler due to the limitation of the space in which the boiler is installed, as shown in FIG. 5A and FIG. 5B, a user may capture an image from the side of a boiler main body. At this time, in order for the apparatus for calculating an estimate for installation of a boiler according to an embodiment of the present invention to calculate installation estimate of the boiler, it is preferable that the user captures images of an upper portion (side surface) of a boiler main body 520 and an upper pipe 510 together and captures images of a lower portion (side surface) of the boiler main body 520 and a pipe cover or a pipe 530.

In the apparatus for calculating an installation estimate of a boiler according to an embodiment of the present invention, an image (FIG. 5A) including the side surface of the boiler main body 520 and the upper pipe 510 and an image (FIG. 5B) of the side surface of the boiler main body 520 and the pipe 530 are compared with information about boiler models, flues, and dimensions of pipes stored in a database to calculate required dimensions of the boiler main body 520, the upper pipe 510, and the pipe 530 included in the boiler region image. For example, dimensions of the height and thickness of the main body may be obtained through a side surface image of the boiler main body, and using the dimensions, the required dimensions of the boiler main body 520, the upper pipe 510, and the pipe 530 included in the boiler region image may be calculated.

As described above, since the upper pipe 510 and the pipe 530 of the boiler are generally circular, there is little error in image analysis according to a capturing angle. Therefore, only with the side surface image of the boiler, the calculation of the thickness dimension (i.e., diameter) may be performed more accurately. In addition, since the upper pipe 510 and the pipe 530 of the boiler are mostly standardized, the length of the upper pipe 510 and the pipe 530 may be calculated together.

Figure 6A:
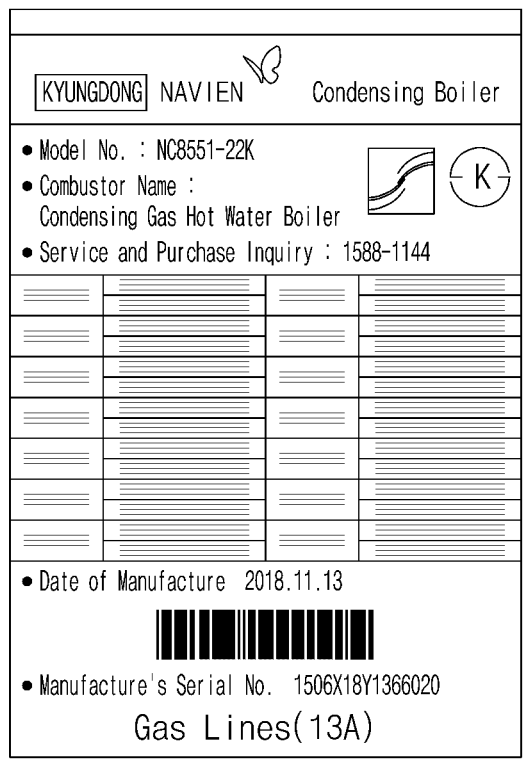
FIG. 6A shows an example of a product specification table attached to a side surface of the main body of a boiler.
Figure 6B:
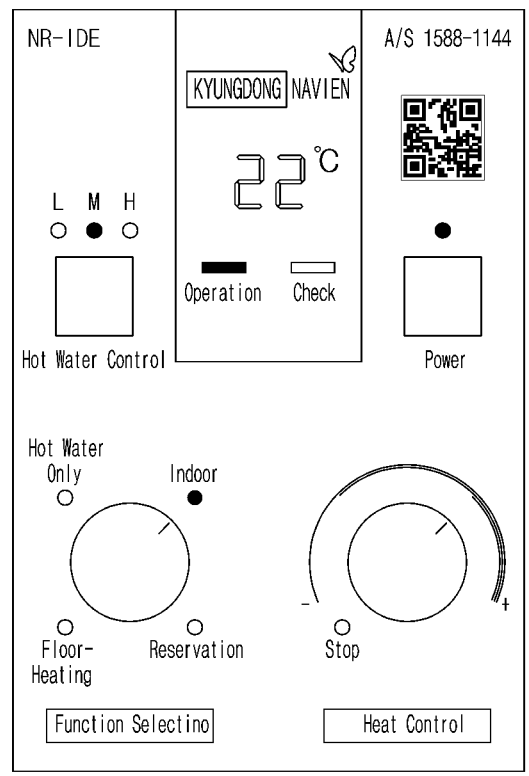
FIG. 6B shows an example of a room controller for operating a boiler.

FIG. 6A shows an example of a product specification table attached to a side surface of the main body of a boiler, and FIG. 6B shows an example of a room controller for operating a boiler.

As described above, when it is not possible to capture a front image of a boiler due to the limitation of space, as shown in FIG. 6A, a product specification table attached to a portion of the boiler body may be captured. In the product specification table, information such as a manufacturer, a model name, a boiler type, a product number, and output is input in detail. Therefore, the image analysis unit of the apparatus for calculating an installation estimate of a boiler according to an embodiment of the present invention may determine the model name of a corresponding boiler only with an image of the product specification table.

Meanwhile, the product specification table of a boiler may be damaged to an extent the table is not visually identifiable, depending on the age of the boiler or the installation environment of the boiler. There may be also a case in which it is difficult to capture a product specification table due to the nature of a space in which a boiler is installed. In this case, it may be difficult to accurately determine a model name only by capturing a boiler itself.

As described above, when it is difficult to capture even the product specification table of a boiler, a user may be allowed to capture an image of a room controller installed inside a room. Most boilers often have a compatible room controller depending on the model of a boiler. Therefore, the apparatus for calculating an installation estimate of a boiler according to an embodiment of the present invention receives an image of a room controller from a user, compares the image with a room controller compatible for each model of a boiler stored in a database, and then determines the model name of a boiler associated with a room controller included in the captured image.

In addition, the room controller of FIG. 6B may operate with a boiler in a wireless communication, or operate in a wired manner. At this time, a room controller previously installed may not be compatible with the model of a boiler main body to be installed. As described above, the apparatus for calculating an estimate for installation of a boiler according to an embodiment of the present invention may calculate a total installation estimate in consideration of estimate for replacing a room controller when the room controller is not compatible with a boiler main body to be replaced.

Figure 7:
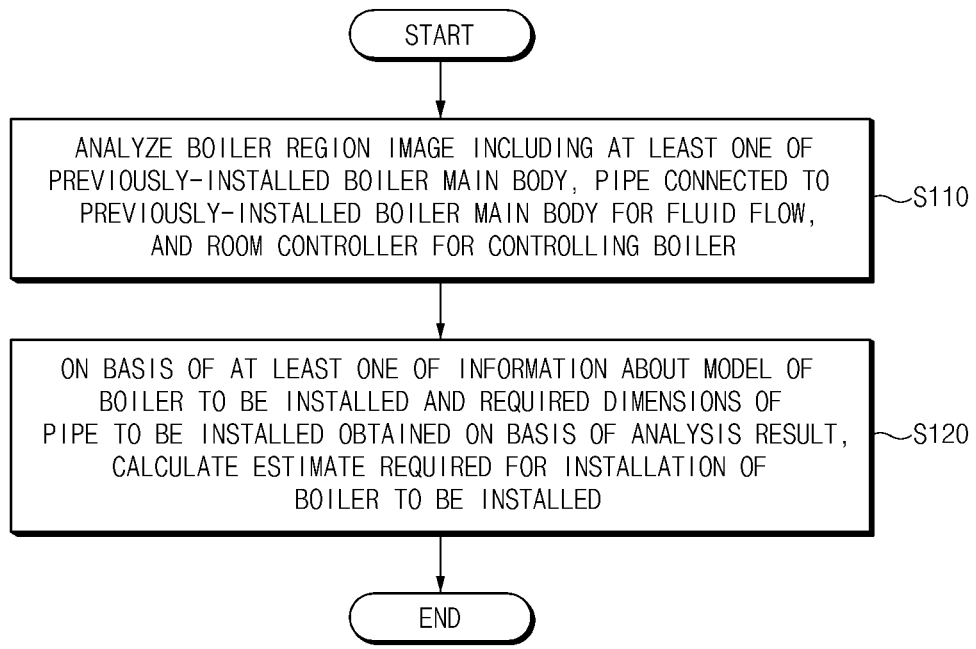
FIG. 7 is a flow chart showing a method for calculating an estimate for installation of a boiler according to an embodiment of the present invention.

FIG. 7 is a flow chart showing a method for calculating an estimate for installation of a boiler according to an embodiment of the present invention.

Referring to FIG. 7, the method for calculating an estimate for installation of a boiler according to an embodiment of the present invention may first analyze a boiler region image including at least one of a previously-installed boiler main body, a pipe connected to the previously-installed boiler main body for fluid flow, and a room controller for controlling a boiler S110. At this time, the pipe may include a flue, a heating water pipe, hot water and cold water pipes, and the like.

In Step S110, at least one of a first information, a second information, or a third information may be obtained by analyzing the boiler region image including a boiler main body and a pipe. For example, the boiler region image may be a front image of a boiler.

Here, the first information may include information about the model of the previously-installed boiler main body, the second information may include at least one of the dimensions of the previously-installed boiler main body and the diameter of the pipe in the boiler region image, and the third information may include the dimensions of the pipe in the boiler region image. For example, the first information, the second information, and the third information may be obtained by an analysis in pixel unit.

In addition, in Step S110, when it is not possible to capture a front image of a boiler, the second information and the third information may be obtained on the basis of a boiler region image including a side surface of the previously-installed boiler main body and the pipe.

Next, on the basis of at least one of information about the model of a boiler to be installed and required dimensions of a pipe to be installed obtained on the basis of the analysis result of the boiler region image, estimate required for the installation of the boiler to be installed may be calculated (S120).

For example, in Step S120, when a pipe of a boiler needs to be replaced, actual dimensions of the previously-installed boiler main body are obtained from a database using the first information, and on the basis of a ratio between the actual dimensions of the previously-installed boiler main body and the dimensions of the boiler main body in the boiler region image, required dimensions of the pipe may be obtained. Alternatively, an actual diameter of the pipe of the boiler may be obtained from the database using the first information, and on the basis of a ratio between the actual diameter of the pipe and the diameter of the pipe in the boiler region image, the required dimensions of the pipe may be obtained.

Specifically, in Step S120, estimate required for the installation of the boiler to be installed may be calculated by adding a price of the main body of the boiler to be installed and a price and installation estimate according to the required dimensions of the pipe. In this case, as described above, installation estimate may be calculated not only for a case in which both a boiler main body and a pipe are replaced together but also for a case in which either a boiler main body or a pipe is replaced.

The above-described method for calculating an estimate for installation of a boiler according to an embodiment of the present invention may be performed using a database for storing information about models of boiler main bodies, information about specifications of boiler main bodies and pipes, information about prices of boiler main bodies and pipes, and information about installation estimates of boiler main bodies and pipes.

Although not shown in FIG. 7, the method for calculating an estimate for installation of a boiler according to an embodiment of the present invention may include the steps of determining a position at which the main body of a boiler to be installed is to be installed, adjusting the dimensions of a pipe to be installed in a boiler region image according to the determined position, and calculating estimate required for the installation of the boiler to be installed on the basis of the adjusted dimensions of the pipe to be installed in the boiler region image. A specific method of adjusting the dimensions of the pipe is as described in FIG. 2.

In addition, the method for calculating an estimate for installation of a boiler according to an embodiment of the present invention may include the steps of obtaining, on the basis of a first position at which the main body of the boiler to be installed and the pipe to be installed are connected in the boiler region image and a second position at which a previously-installed pipe ends in the boiler region image, the dimensions of the pipe to be installed in the boiler region image, converting the dimensions of the pipe to be installed in the boiler region image into required dimensions of the pipe to be installed, and calculating, on the basis of the required dimensions of the pipe to be installed, estimate required for the installation of the boiler to be installed.

In addition, the method for calculating an estimate for installation of a boiler according to an embodiment of the present invention may further include the steps of storing information about prices and installation estimates of distributors of boilers in a database, obtaining the information about prices and installation estimates of distributors from the database, and calculating, on the basis of the information about prices and installation estimates of distributors, estimate required for the installation of the distributor.

In addition, the method for calculating an estimate for installation of a boiler according to an embodiment of the present invention may include the steps of making a list of time required for work and materials used to install the boiler for each boiler region image to calculate the estimate required for the actual installation of the boiler and storing data obtained by matching the time required for work and the materials used to install the boiler listed for each image with the estimate required for the actual installation of the boiler.

In this case, a step of performing data learning through Machine Learning on the basis of the data obtained by matching the time required for work and the materials used to install the boiler listed for each image stored in the database with the estimate required for the actual installation of the boiler may be further included.

In addition, the method for calculating an estimate for installation of a boiler according to an embodiment of the present invention may include the steps of, where there may be objects present near a boiler in a boiler region image, obtaining required dimensions of the objects using the first information, the second information, and the third information, and calculating, on the basis of the installation difficulty of the boiler to be installed calculated in consideration of the required dimensions of the objects, additional estimate required to install the boiler to be installed.

Additionally, the method for calculating an estimate for installation of a boiler according to an embodiment of the present invention may include performing correction of the boiler region image when the orientation or level of the boiler region image is not aligned.

Figure 8A:
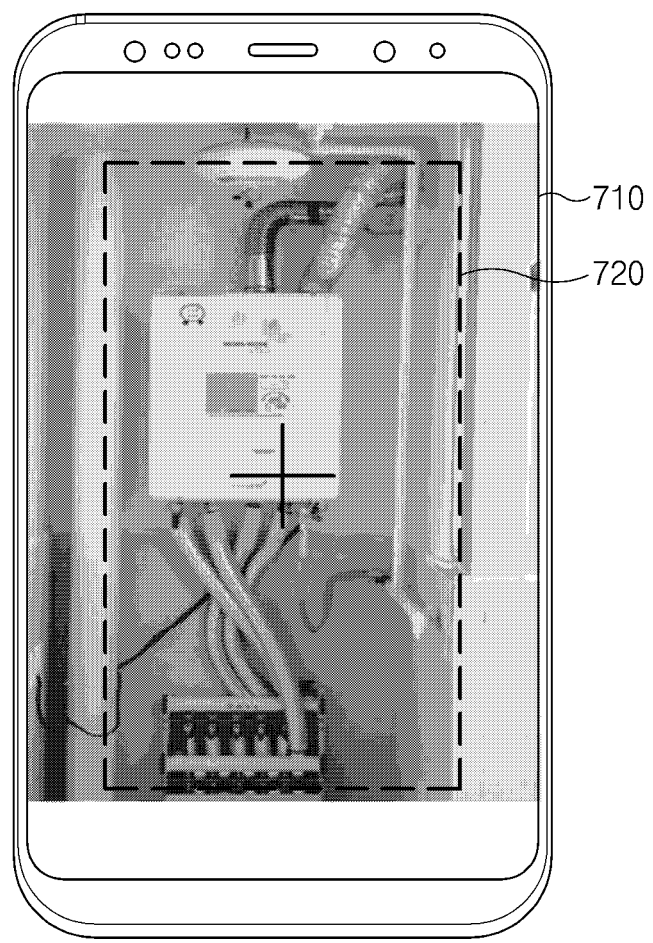
FIG. 8A shows that a user captures an image of a boiler with a terminal to transmit the image to an apparatus for calculating an estimate for installation of a boiler according to an embodiment of the present invention.

FIG. 8A shows that a user captures an image of a boiler with a terminal to transmit the image to an apparatus for calculating an estimate for installation of a boiler according to an embodiment of the present invention.

FIG. 8A shows that a front image 710 of a region in which the boiler is installed is captured through an application on a user terminal. At this time, the application of the user terminal may provide a guide function when the user captures an image of the boiler.

Specifically, when the user captures an image of the boiler, the application displays a separate guide line 720 on a boiler region image as shown in FIG. 8A, and may induce the user to capture an image to include in the guideline all of a boiler main body, an upper pipe (flue), a lower pipe, and the like required for calculating an estimate for installation of the boiler.

As described above, the application communicating with the apparatus for calculating an estimate for installation of a boiler according to an embodiment of the present invention provides a guide function such that all the information required for calculating an estimate for installation of a boiler (e.g., dimensions information of a boiler main body, an upper pipe, and a pipe) is included on an image, thereby accommodating the user when capturing an image of the boiler.

Figure 8B:
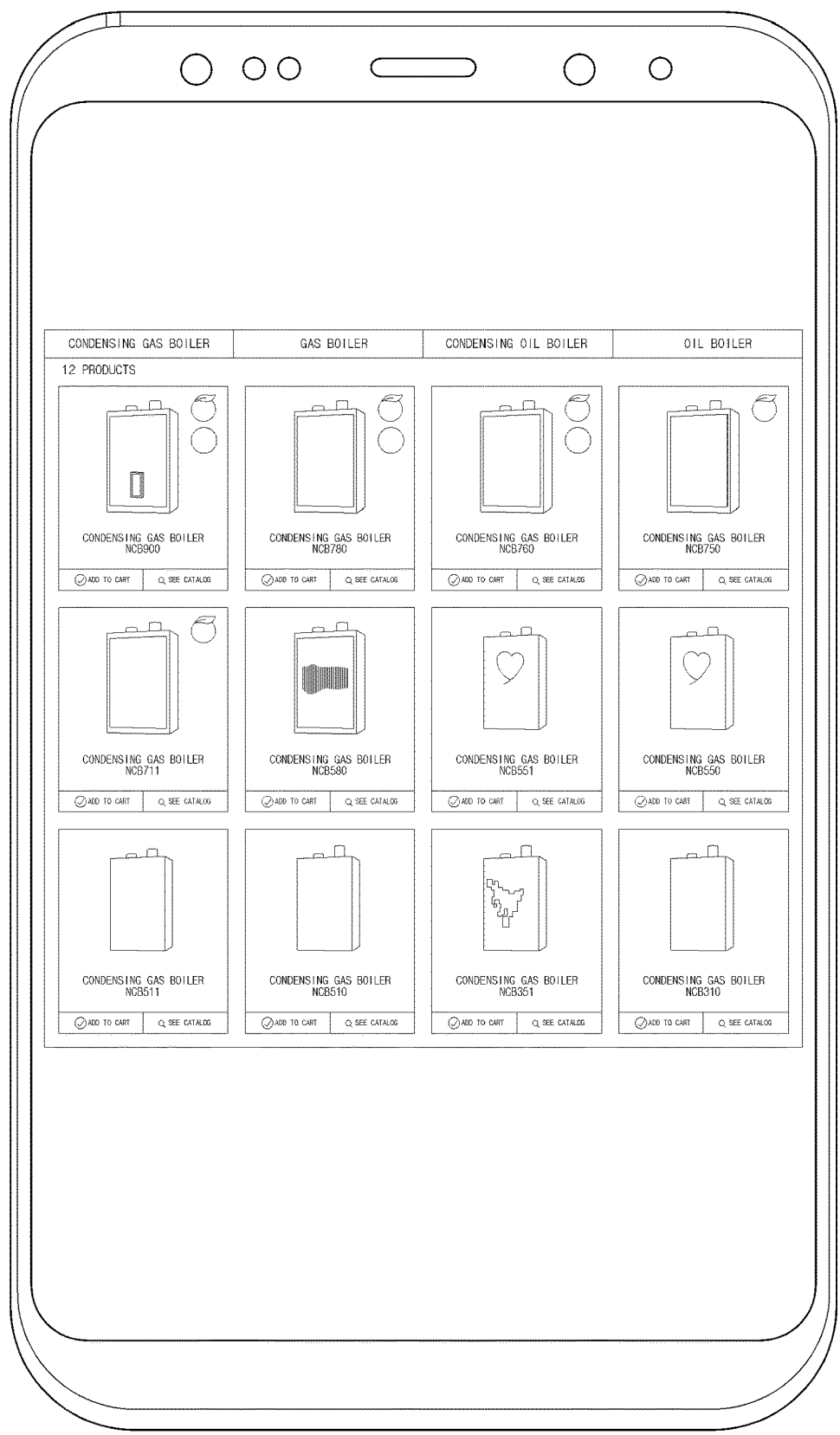
FIG. 8B is a diagram showing a boiler selection screen on an application communicating with an apparatus for calculating an estimate for installation of a boiler according to an embodiment of the present invention.

FIG. 8B is a diagram showing a boiler selection screen on an application communicating with an apparatus for calculating an estimate for installation of a boiler according to an embodiment of the present invention.

Referring to FIG. 8B, a list of boilers to be newly installed may be displayed on the application of a user terminal. For example, the application is linked to the sales site of each boiler manufacturer, so that when a user selects a manufacturer, the user may be provided with a list of boiler models of the corresponding manufacturer.

Figure 8C:
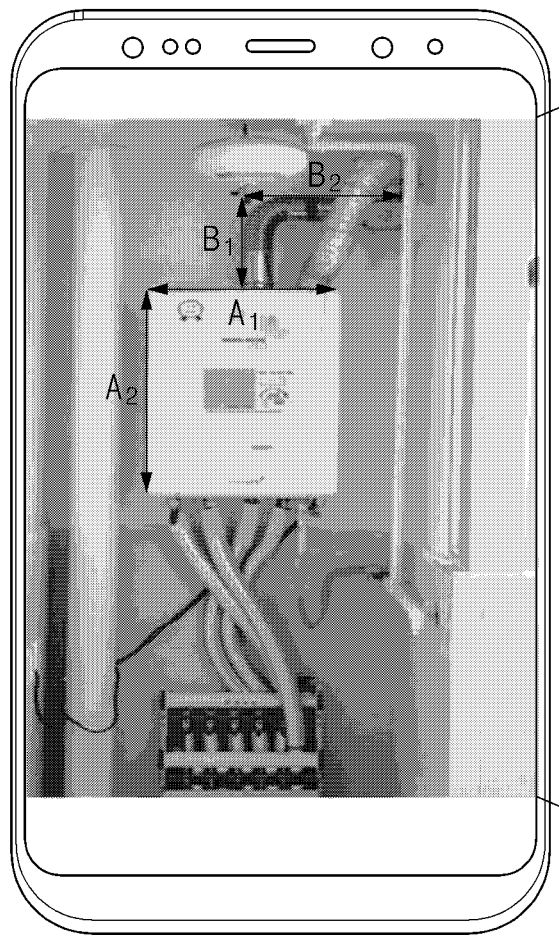
FIG. 8C is a diagram showing calculating required dimensions of a pipe of a boiler in an apparatus for calculating an estimate for installation of a boiler according to an embodiment of the present invention.

In addition, the boiler selection screen on the application shown in FIG. 8B may be provided before the boiler image capturing of FIG. 8A, or may be provided after the dimensions for each material in the boiler region of FIG. 8C are obtained.

FIG. 8C is a diagram showing calculating required dimensions of an upper pipe (flue) of a boiler in an apparatus for calculating an estimate for installation of a boiler according to an embodiment of the present invention.

Referring to FIG. 8C, when a model name of a boiler main body is obtained through an image analysis unit of the apparatus for calculating an estimate for installation of a boiler according to an embodiment of the present invention, actual specifications of the corresponding model may be obtained from a database.

In addition, by comparing the actual specifications (horizontal×vertical=440×695) of the boiler main body model obtained from the database with the specifications of the boiler main body on a boiler region image (e.g., $A_1$ and $A_2$ in FIG. 8C), a ratio d between dimensions on the image and required dimensions may be calculated.

Next, on the basis of the calculated ratio and dimensions of the flue on the boiler region image, required dimensions of the flue may be calculated (($B_1+B_2$)×d).

Meanwhile, in FIG. 8C, a case in which the dimensions and installation positions of a previously-installed boiler main body and a boiler main body to be installed are the same. However, when the dimensions and installation positions of a previously-installed boiler main body and a boiler main body to be installed are different, as described above, a region of the boiler main body to be newly installed is overlapped on a region of the previously-installed boiler main body, and then, by setting a portion in which the boiler main body to be newly installed and a pipe to be installed are connected as a starting point and setting a point (end portion of a pipe) at which a previously-installed pipe ends as an end point, an actual distance between the two points may be calculated.

In addition, in FIG. 8C, only the method for calculating the required dimensions of the flue is shown. However, required dimensions of a lower pipe of a boiler may also be calculated by the same method.

Figure 8D:
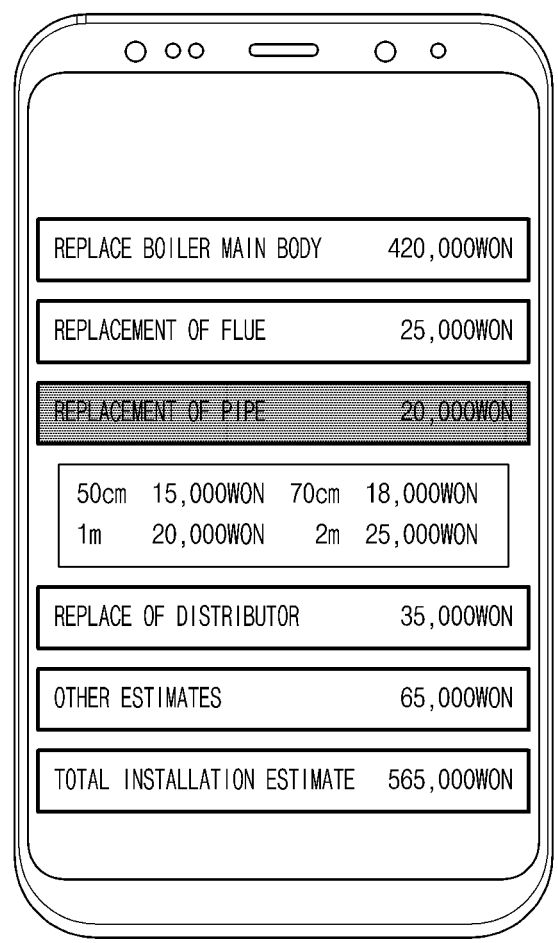
FIG. 8D shows an installation estimate of a boiler calculated by an apparatus for calculating an estimate for installation of a boiler according to an embodiment of the present invention displayed on an application of a user terminal.

FIG. 8D shows an installation estimate of a boiler calculated by an apparatus for calculating an estimate for installation of a boiler according to an embodiment of the present invention displayed on an application of a user terminal.

Referring to FIG. 8D, the total installation estimate of a boiler may include the replacement estimate of a boiler main body, the replacement estimate of a flue, the replacement estimate of a pipe, the replacement estimate of a distributor, and other estimates (e.g., estimate of removing objects around a boiler, etc.). At this time, the replacement estimate for each material may include both the price and the installation estimate of the material.

In addition, as shown in FIG. 8D, when a user clicks on the estimate for a specific material on the application, estimate per specifications of the corresponding material may be provided. For example, when the user selects the estimate for a pipe on the application screen, estimate per length of the corresponding pipe may be displayed.

Meanwhile, the apparatus for calculating an estimate for installation of a boiler according to an embodiment of the present invention may request a user to evaluate an error range between an estimated installation estimate of a boiler and an actual installation estimate required through the application of the user terminal. Therefore, the apparatus for calculating an estimate for installation of a boiler according to an embodiment of the present invention may analyze the evaluation data of a user and reflect analysis result data in an algorithm for calculating an estimated installation estimate of a boiler, thereby improving the accuracy of the estimate calculation.

Figure 9:
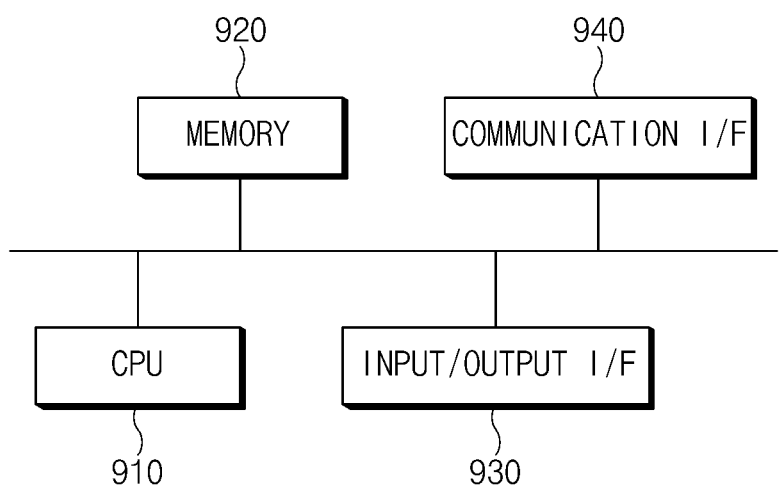
FIG. 9 shows a hardware configuration of an apparatus for calculating an estimate for installation of a boiler according to an embodiment of the present invention.

FIG. 9 shows a hardware configuration of an apparatus for calculating an estimate for installation of a boiler according to an embodiment of the present invention.

Referring to FIG. 9, an apparatus 900 for calculating an estimate for installation of a boiler according to an embodiment of the present invention may include a central processing unit (CPU) 910, a memory 920, an input/output I/F 930, and a communication I/F 940.

The CPU 910 may be a processor for executing a boiler installation estimate calculation program stored in the memory 920, processing various data of the apparatus for calculating an estimate for installation of a boiler according to an embodiment of the present invention, and performing functions of FIG. 2.

The memory 920 may store a boiler installation estimate calculation program. In addition, the memory 920 may store a boiler region image received from a user application, model information of a selected boiler, data obtained about a boiler main body and dimensions of a pipe, calculated boiler installation estimate, and the like.

The memory 920 may be prepared in a plurality if needed. The memory 920 may be a volatile memory or a non-volatile memory. As the non-volatile memory, RAM, DRAM, SRAM, and the like may be used as the memory 920. As the volatile memory, ROM, PROM, EAROM, EPROM, EEPROM, a flash memory, and the like may be used as the memory 920. The examples of the memory 920 listed above are only exemplary, and are not limited thereto.

The input/output I/F 930 may provide an interface which connects between an input device (not shown) such as a keyboard, a mouse, and a touch panel and an output device such as a display (not shown) and the CPU 910 to transmit and receive data.

The communication I/F 940 is a component capable of transmitting and receiving various data to and from a user terminal, and may be various devices capable of supporting wired or wireless communication. For example, the communication I/F 940 may receive a boiler region image and a selected boiler model information from the user terminal, and may transmit a calculated boiler installation estimate to the user terminal.

As described above, the user application according to an embodiment of the present invention is stored in the memory 920 and processed by the CPU 910, so that may be implemented, for example, as a module which performs each functional block illustrated in FIG. 2.

Accordingly, the apparatus for calculating an estimate for installation of a water heater according to the present embodiment is applied to a water heater such as a boiler for providing heating, a water heater for providing hot water (a direct-water-type water heater without a separate hot water tank, or a tank-type water heater with a separate hot water tank), or a water heater combined boiler, and may automatically calculate an installation estimate through an image analysis for the water heater.

As described above, according to the apparatus and the method for calculating an estimate for installation of a water heater, when a water heater is newly installed, an installation estimate is automatically calculated through an image analysis for the water heater, thereby enabling a user of the water heater to anticipate installation estimate in advance, and correct information about estimate required is provided even after the installation of the water heater, thereby securing reliability in the installation estimate.

In the above, even if all the components constituting the embodiments of the present invention is described as being combined or combined to operate as one, the present invention is not necessarily limited to these embodiments. that is, if within the scope of the present invention, all of the components maybe selectively combined and operated as one or more.

In addition, the terms "include," "consist," or "have" as described above mean that a corresponding component may be intrinsic, unless specifically stated otherwise, and it should be interpreted as including other components rather than excluding other components. All terms including technical or scientific terms have the same meanings as those commonly understood by those skilled in the art to which the present invention pertains, unless defined otherwise. Terms commonly used as those defined in a commonly used dictionary should be construed as being consistent with the context of the relevant art, and are not to be construed in an idealized or overly formal sense unless expressly defined in the present invention.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain, and the scope of the technical spirit of the present invention is not limited by these embodiments. The scope of protection of the present invention should be construed by the following claims, and all technical concepts within the scope of the present invention should be construed as being included within the scope of the rights of present invention.

DESCRIPTION OF THE REFERENCE NUMERALS OR SYMBOLS

100: User terminal
200: Boiler installation estimate calculation apparatus (server)

210: Image analysis unit Processing unit
230: Database
240: Communication unit
300, 400: Boiler 310, 410, 510: Upper pipe (flue)
320, 420, 520: Boiler body 330, 430, 530: Lower pipe
340, 440: Distributor 710: Boiler shooting screen
720: Shooting guidelines

What is claimed is:

1. An apparatus calculating an installation estimate for installation of a water heater, the apparatus comprising:
    an image analysis unit analyzing a water heater region image including at least one of a previously-installed water heater main body, a previously-installed pipe connected to the previously-installed water heater main body for fluid flow, and a room controller for controlling a water heater; and
    a processing unit calculating an estimate required for the installation of a water heater to be installed on the basis of at least one of information about the model of the water heater to be installed and required dimensions of a pipe to be installed obtained on the basis of an analysis result of the image analysis unit,
    wherein the processing unit determines a position at which the main body of the water heater to be installed is to be installed, adjusts the dimensions of the pipe to be installed in the water heater region image according to the determined position, and calculates an estimate required for the installation of the water heater to be installed on the basis of the adjusted dimensions of the pipe to be installed in the water heater region image.

2. The apparatus of claim 1, wherein
    the image analysis unit analyses the water heater region image and obtains at least one of a first information, a second information, and a third information as the analysis result, wherein
    the first information includes information about the model of the previously-installed water heater main body,
    the second information includes at least one of the dimensions of the previously-installed water heater main body and the diameter of the previously-installed pipe in the water heater region image, and
    the third information includes the dimensions of the previously-installed pipe in the water heater region image.

3. The apparatus of claim 2, wherein the image analysis unit obtains the first information on the basis of at least one of the appearance of the previously-installed water heater main body in the water heater region image, the product specification table of the previously-installed water heater main body in the water heater region image, and the room controller in the water heater region image.

4. The apparatus of claim 1, wherein the processing unit obtains, on the basis of a first position at which the main body of the water heater to be installed and the pipe to be installed are connected in the water heater region image and a second position at which the previously-installed pipe ends in the water heater region image, the dimensions of the pipe to be installed in the water heater region image, and converts the dimensions of the pipe to be installed in the water heater region image into the required dimensions of the pipe to be installed, thereby calculating the estimate required for the installation of the water heater to be installed.

5. The apparatus of claim 1, wherein the processing unit adds a price of the water heater main body to be installed and a price and installation estimate according to the required dimensions of the pipe to be installed, thereby calculating the estimate required for the installation of the water heater to be installed.

6. The apparatus of claim 1, wherein a database for stores the information about the model of the previously-installed water heater main body, information about actual dimensions of the previously-installed water heater main body and an actual diameter of the pipe of the previously-installed water heater, information about prices of the water heater main body to be installed and the pipe to be installed, and information about installation estimate of the water heater main body to be installed and the pipe to be installed.

7. The apparatus of claim 6, wherein the processing unit
    obtains the actual dimensions of the previously-installed water heater main body from the database using the information about the model of the previously-installed water heater main body and obtains the required dimensions of the pipe to be installed on the basis of a ratio between the actual dimensions of the previously-installed water heater and the dimensions of the previously-installed water heater main body in the water heater region image, or
    obtains the actual diameter of the pipe of the previously-installed water heater from the database using the information about the model of the previously-installed water heater main body and obtains the required dimensions of the pipe to be installed on the basis of a ratio between the actual diameter of the previously-installed pipe and the diameter of the previously-installed pipe in the water heater region image.

8. The apparatus of claim 6, wherein the processing unit performs data learning through Machine Learning on the basis of data obtained by matching time required for work and materials used for the actual installation of the water heater to be installed which are listed for the image stored in the database with an estimate required for the actual installation of the water heater to be installed.

9. The apparatus of claim 2, wherein the processing unit obtains the second information and the third information on the basis of a water heater region image including a side surface of the previously-installed water heater main body and the previously-installed pipe.

10. A method calculating an installation estimate for the installation of a water heater, the method comprising the steps of:
    analyzing a water heater region image including at least one of a previously-installed water heater main body, a previously-installed pipe connected to the previously-installed water heater main body for fluid flow, and a room controller for controlling a water heater; and
    calculating, on the basis of at least one of information about the model of a water heater to be installed and required dimensions of a pipe to be installed obtained on the basis of an analysis result of the water heater region image, an estimate required for the installation of the water heater to be installed,
    wherein the step of calculating the estimate required for the installation of the water heater to be installed comprising,
    determining a position at which the main body of the water heater to be installed is to be installed;
    adjusting, according to the determined position, the dimensions of the pipe to be installed in the water heater region image; and calculating, on the basis of the adjusted dimensions of the pipe to be installed in the water heater region image, an estimate required for the installation of the water heater to be installed.

11. The method of claim 10, wherein the step of analyzing the water heater region image obtains at least one of a first information, a second information, and a third information as the analysis result, wherein
the first information includes information about the model of the previously-installed water heater main body,
the second information includes at least one of the dimensions of the previously-installed water heater main body and the diameter of the previously-installed pipe in the water heater region image, and
the third information includes the dimensions of the previously-installed pipe in the water heater region image.

12. The method of claim 11, wherein the step of analyzing the water heater region image obtains the first information on the basis of at least one of the appearance of the previously-installed water heater main body in the water heater region image, a product specification table of the previously-installed water heater main body in the water heater region image, and the room controller in the water heater region image.

13. The method of claim 10, further comprising the steps of:
obtaining, on the basis of a first position at which the main body of the water heater to be installed and the pipe to be installed are connected in the water heater region image and a second position at which the previously-installed pipe ends in the water heater region image, the dimensions of the pipe to be installed in the water heater region image;
converting the dimensions of the pipe to be installed in the water heater region image into the required dimensions of the pipe to be installed; and
calculating, on the basis of the required dimensions of the pipe to be installed, the estimate required for the installation of the water heater to be installed.

14. The method of claim 10, wherein the step of calculating the estimate required for the installation of the water heater to be installed calculates the estimate required for the installation of the water heater to be installed by adding a price of the water heater main body to be installed and a price and installation estimate according to the required dimensions of the pipe to be installed.

15. The method of claim 10 performed by using a database storing the information about the model of the previously-installed water heater main body, information about actual dimensions of the previously-installed water heater main body and an actual diameter of the pipe of the previously-installed water heater, information about prices of the water heater main body to be installed and the pipe to be installed, and information about installation estimate of the water heater main body to be installed and the pipe to be installed.

16. The method of claim 15, further comprising the steps of:
obtaining the actual dimensions of the previously-installed water heater main body from the database using the information about the model of the previously-installed water heater main body; and
obtaining the required dimensions of the pipe to be installed on the basis of a ratio between the actual dimensions of the previously-installed water heater and the dimensions of the previously-installed water heater main body in the water heater region image, or
obtaining the actual diameter of the pipe of the previously-installed water heater from the database using the information about the model of the previously-installed water heater main body; and
obtaining the required dimensions of the pipe to be installed on the basis of a ratio between the actual diameter of the previously-installed pipe and the diameter of the previously-installed pipe in the water heater region image.

17. The method of claim 15, further comprising,
performing data learning through Machine Learning on the basis on data obtained by matching time required for work and materials used for the actual installation of the water heater to be installed which are listed for each image stored in the database with estimate required for the actual installation of the water heater to be installed.

18. The method of claim 11, further comprising,
obtaining the second information and the third information on the basis of a water heater region image including a side surface of the previously-installed water heater main body and the previously-installed pipe.

* * * * *